Nov. 9, 1926.

C. B. McCALLUM 1,606,252

ADJUSTABLE GROUND FOR PLASTERING

Filed June 19, 1924

INVENTOR
Charles B. McCallum
BY M. C. Frank
ATTORNEY

Patented Nov. 9, 1926.

1,606,252

UNITED STATES PATENT OFFICE.

CHARLES B. McCALLUM, OF OAKLAND, CALIFORNIA.

ADJUSTABLE GROUND FOR PLASTERING.

Application filed June 19, 1924. Serial No. 721,074.

My present invention relates in general to the plasterer's art, and has particular reference to an adjustable and removable ground for use by plasterers in obtaining a uniform thickness and absolute parallelism of plastered walls about an opening, such as a doorway or the like.

This invention relates to the same subject matter as my co-pending application, Serial Number 714,279, filed May 19, 1924, but differs therefrom to the extent that the present invention is adjustable to accommodate a series of walls having different thicknesses.

Figure 1:
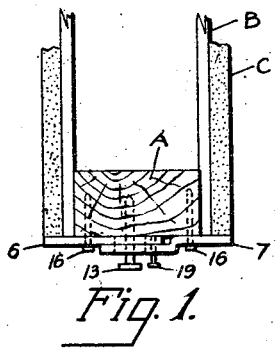
Figure 5:
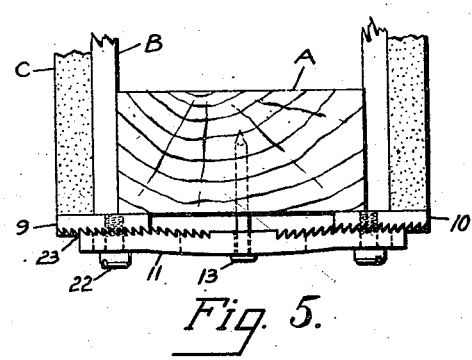
Figure 2:
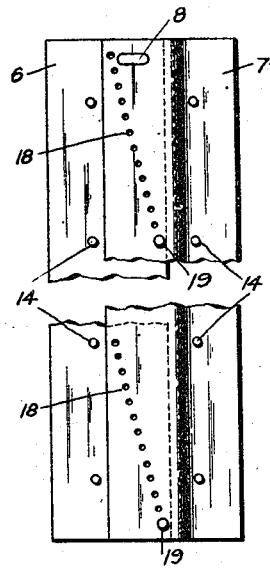
Figure 4:
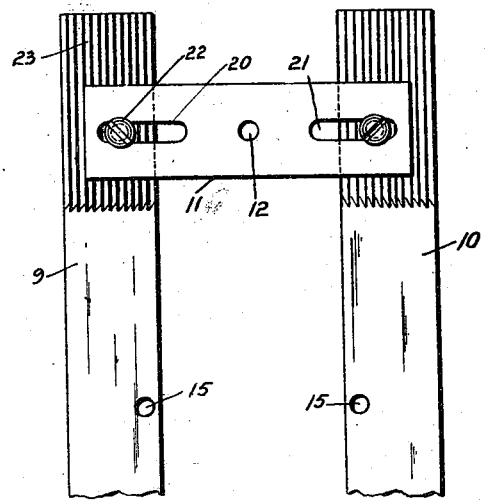
Figure 3:
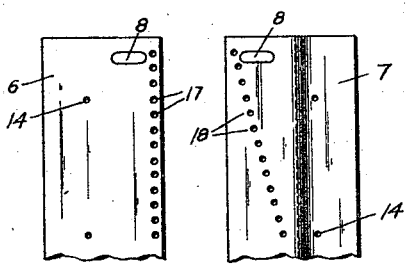

The salient features of the invention are illustrated in the accompanying sheet of drawings, in which:

Figure 1 is a horizontal section through the studding, lathing and plaster about a wall opening, and illustrates the application of the invention; the latter is shown in top view. Fig. 2 is a face view in elevation of the form of ground shown in the previous figure, and Fig. 3 is a detail view in elevation of an end portion of it, but with the parts separated for clearness. Fig. 4 is a front elevation of a second form of ground, and Fig. 5 is a horizontal section similar to Fig. 1 but showing the modified form of ground applied.

Referring now to the drawings in detail: The letter A represents the studding about a wall opening, such as a doorway and B the lathing and C the plaster.

The heretofore employed method of grounding is more or less unsatisfactory for many reasons, and principally so on account of the wood ground used. The wood ground follows the outer surface of the framing or woodwork, so to speak, and the latter varies considerable in width and parallelism, and makes much hand trimming necessary for jamb and casing work later because of this fact. With the use of my improved ground, these and other objections are entirely eliminated, and it is possible to get the plastered surfaces in absolute parallelism.

Each ground consists of two members, and in Figs. 1 to 3, the members 6 and 7 each have a registering and suitably shaped hole 8 for suspending the assembled ground in place on the studding. The members 9 and 10 of Figs. 4 and 5 are assembled by cross-bars 11, having a suspension hole 12. In either case I can use nails 13 or the like to hang the ground, the same being driven into the studding A. After the ground has been hung properly, it is anchored securely in such position by the use of other nails inserted through the holes 14 (Fig. 2), or holes 15 (Fig. 4). The securing nails are shown as at 16 in Fig. 1.

When either of the two types of ground are thus hung, plumbed and secured, the ground may be relied upon to give an absolute uniform and parallel plastered wall. After the plaster has been applied, the ground may be removed by extracting the nails and set aside for its next use.

One important feature of the present ground resides not only in the fact that it is accurate in use, but as it may be made from sheet-metal, it will wear indefinitely and withstand comparatively hard usage without destroying its accuracy.

Referring again to the form shown in Figs. 1 to 3, I propose to allow for width adjustments so that the same ground may be used for walls of different thicknesses. To accomplish this adjustability, I suggest making the ground in two parts 6 and 7 as previously stated. The part 6 may be a flat sheet-metal strip and also the part 7 including the L-bend adapted to overlap the part 6, but leaving its remaining width in the same plane as the surface of the part 6, so that the parts 6 and 7 have inner surfaces adapted to contact with a surface of the studding A and are adapted to project beyond the studding with the inner surfaces in the same plane as the studding surface. The series of uniformly spaced holes 17 in the part 6, (Fig. 3), may be in a straight line and parallel with the opposite edge, whereas the holes 18 in the part 7 are arranged on a slant, and with the holes thus made the desired width adjustments can be realized by placing the pins or nails 19 in the properly selected registering holes, top and bottom.

For much wider and unusually thick walls, I believe the form shown in Figs. 4 and 5 would prove more satisfactory. In this particular form I intend to employ the pair of flat metal strips 9 and 10 of any width suitable for the purpose, and connect the same by the horizontal bar or strap 11.

To adjust the spaced relation of the strips 9 and 10, I make the strap with slots 20 and 21 and adapt them to receive set-screws or the like 22. These screws are threaded into holes in the strips so that the strap may be clamped to them and hold them in desired spaced relation within the range of the slots.

To securely hold the set position of the adjusted strips, I suggest the use of a serrated or toothed surface 23 on the face of the strips, and the use of a corresponding surface on the underside of the strap end portions. With this construction the clamped position of the strap on the strips will not slip, and the parallelism of the ground will be maintained with certainty.

From the forgoing description taken in connection with the accompanying drawings, the advantages of the construction and method of operation will be readily understood by those skilled in the art to which the invention appertains, and while I have described the principle of operation, together with the device which I now consider to be the best embodiments thereof, I desire to have it understood that the device shown is merely illustrative and that such changes may be made, when desired, as fall within the scope of the appended claims.

Having thus described my invention, what I claim as new and desire to secure by Letters Patent of the United States, is the following:

1. An adjustable ground comprising a pair of vertically disposed ground members, which have surfaces adapted to be in a plane with each other and to contact with a surface of a studding, the members being adapted to project beyond the studding with said contacting surfaces in the same plane as the studding surface; and means for holding the members relatively of each other in adjusted position.

2. An adjustable metal ground comprising a pair of ground members having surfaces adapted to be in a plane with each other and to contact with a surface of a studding, the members being adapted to project beyond the studding; and means for adjustably securing the members to accommodate the same to walls of different thickness, the said means holding the members together with their respective surface areas at their outer edges in the same plane as the studding surface.

3. An adjustable ground having means for securing the same to a studding in a wall opening, said ground having surfaces adapted to contact with a surface of the studding, and the ground being adapted to project beyond the opposite edges of the studding with said contacting surfaces in the same plane as the studding surface to gage the thickness of the plaster for a wall about said opening, and means for holding the ground in the gaging position beyond the studding.

4. An adjustable ground having means for securing the same to a studding in a wall opening, said ground adapted to project beyond the opposite edges of the studding to gage the thickness of the plaster for a wall about said opening, and means for holding the ground in the gaging position beyond the studding, said ground comprising a pair of strips, portion of one of the strips being offset in a plane in advance of its remaining portion and adapted to overlap the other of said strips to leave the faces of both strips in the same plane for contact with the studding.

5. An adjustable ground having means for securing the same to a studding in a wall opening, said ground comprising a pair of strips, one of the strips being flat and the other strip having a portion thereof offset adjacent one of its edges and adapted to overlap the first-named strip, said strips being provided with openings, and pins for the openings for adjustably securing the strips together to accommodate the ground to walls of different thickness.

In testimony whereof I affix my signature.

CHARLES B. McCALLUM.